United States Patent
Harris et al.

(10) Patent No.: US 11,246,416 B2
(45) Date of Patent: Feb. 15, 2022

(54) LAMINATED COUNTERTOP ASSEMBLY

(71) Applicant: V-T Industries Inc., Holstein, IA (US)

(72) Inventors: Tom Harris, New London, WI (US); Cordell Burton, Storm Lake, IA (US); Joel Tyler, Cushing, IA (US); Aron Fleischmann, Huxley, IA (US)

(73) Assignee: V-T Industries Inc., Holstein, IA (US)

( * ) Notice: Subject to any disclaimer, the term of this patent is extended or adjusted under 35 U.S.C. 154(b) by 0 days.

(21) Appl. No.: 17/025,334

(22) Filed: Sep. 18, 2020

(65) Prior Publication Data
US 2021/0085081 A1 Mar. 25, 2021

Related U.S. Application Data

(60) Provisional application No. 62/973,203, filed on Sep. 23, 2019, provisional application No. 62/995,743, filed on Feb. 13, 2020.

(51) Int. Cl.
*A47B 96/20* (2006.01)
*B32B 3/06* (2006.01)
(Continued)

(52) U.S. Cl.
CPC .......... *A47B 96/206* (2013.01); *A47B 77/022* (2013.01); *A47B 96/18* (2013.01);
(Continued)

(58) Field of Classification Search
CPC ..... A47B 96/206; A47B 96/18; A47B 96/201; A47B 77/022; B32B 21/08; B32B 21/06;
(Continued)

(56) References Cited

U.S. PATENT DOCUMENTS 2,654,648 A * 10/1953 Burke ................... A47B 13/08
108/27
2,688,523 A * 9/1954 Norman ............... A47B 77/022
108/27
(Continued)

FOREIGN PATENT DOCUMENTS

WO 2011162687 A1 12/2011

OTHER PUBLICATIONS

CustomCraft Countertops, Countertop Installation, Aug. 3, 2016, https://web.archive.org/web/2016080321038/https://hw.menardc.com/main/items/media/COUNT001/Install_Instruct/LaminateInstallDirections_Bind1.pdf (Year: 2016).*
(Continued)

*Primary Examiner* — Daniel J Troy
*Assistant Examiner* — Timothy M Ayres
(74) *Attorney, Agent, or Firm* — Ryan T. Grace; Advent, LLP

(57) ABSTRACT

A laminated countertop assembly can include a first generally longitudinal slab with a first substrate, where the first substrate has lamination on a countertop side of the first substrate and lamination on an edge side of the first substrate that extends along a first portion of a length of the edge side of the first substrate. The first substrate can also include a first miter cut angled into the first substrate and slots extending into the first substrate for receiving biscuits. The laminated countertop assembly can also include a second generally longitudinal slab with a second substrate, where the second substrate has lamination on a countertop side of the second substrate and lamination on an edge side of the second substrate. The second substrate can also include a second miter cut at a corner of the second substrate and slots extending into the second substrate for receiving the biscuits.

17 Claims, 12 Drawing Sheets

(51) Int. Cl.
  *B32B 21/02* (2006.01)
  *B32B 21/08* (2006.01)
  *A47B 77/02* (2006.01)
  *B27M 3/00* (2006.01)
  *A47B 96/18* (2006.01)
  *B32B 21/06* (2006.01)

(52) U.S. Cl.
  CPC ........... *A47B 96/201* (2013.01); *B27M 3/002* (2013.01); *B27M 3/0066* (2013.01); *B27M 3/0073* (2013.01); *B32B 3/06* (2013.01); *B32B 21/02* (2013.01); *B32B 21/06* (2013.01); *B32B 21/08* (2013.01); *A47B 2230/0059* (2013.01)

(58) Field of Classification Search
  CPC .......... B32B 21/02; B32B 3/06; B27M 3/002; B27M 3/0066; B27M 3/0073
  USPC ...................................................... 312/140.3
  See application file for complete search history.

(56) References Cited

U.S. PATENT DOCUMENTS

| | | | | |
|---|---|---|---|---|
| 3,352,080 A | * | 11/1967 | Rondum | A47B 77/022 156/245 |
| 3,606,508 A | * | 9/1971 | Burnes | B27M 3/00 312/140.3 |
| 4,701,066 A | | 10/1987 | Beam et al. | |
| 4,730,425 A | * | 3/1988 | Young | E04F 11/163 52/179 |
| 5,018,628 A | * | 5/1991 | Schenck | A47B 96/18 108/27 |
| 5,088,247 A | * | 2/1992 | Young | E04F 11/163 52/179 |
| 5,386,673 A | * | 2/1995 | Bellegarde | E04F 11/108 52/179 |
| 5,595,427 A | * | 1/1997 | Peters | A47B 87/002 108/64 |
| 6,131,521 A | * | 10/2000 | Nelson | A47B 77/022 108/27 |
| 8,215,726 B1 | * | 7/2012 | Klassen | A47B 96/18 312/140.1 |
| 2008/0169736 A1 | | 7/2008 | Bell et al. | |
| 2015/0230600 A1 | | 8/2015 | Schulte | |
| 2017/0325582 A1 | | 11/2017 | Mort et al. | |

OTHER PUBLICATIONS

Mal-O-Sen Co., Inc, Quality Laminate Countertops, Oct. 17, 2015, https://web.archive.org/web/20151017040717/http://mal-o-sen.com:80assemble_miter.html (Year: 2015).*

Scott, Drilling Pocket Holes on Miter Joints Requires Careful Planning, Nov. 7, 2017, www.sawsonskates.com (Year: 2017).*

Scott, Need to Know Pocket Hole Tips for Edge Joints, Feb. 13, 2018, www.sawsonskates.com (Year: 2018).*

Notification of Transmittal of the International Search Report and the Written Opinion of the International Searching Authority,or the Declaration dated Dec. 24, 2020 for App. No. PCT/US20/51463.

* cited by examiner

LAMINATED COUNTERTOP ASSEMBLY

CROSS-REFERENCE TO RELATED APPLICATIONS

The present application claims the benefit under 35 U.S.C. § 119(e) of U.S. Provisional Application Ser. No. 62/973,203, filed Sep. 23, 2019, and U.S. Provisional Application Ser. No. 62/995,743, filed Feb. 13, 2020, which are herein incorporated by reference in their entireties.

BACKGROUND

The term "countertop" generally refers to a horizontal work surface for kitchens or other food preparation areas, bathrooms, and so forth. Countertop is frequently installed on or supported by underlying cabinetry.

DRAWINGS

The Detailed Description is described with reference to the accompanying figures. The use of the same reference numbers in different instances in the description and the figures may indicate similar or identical items.

DETAILED DESCRIPTION

Figure 1:
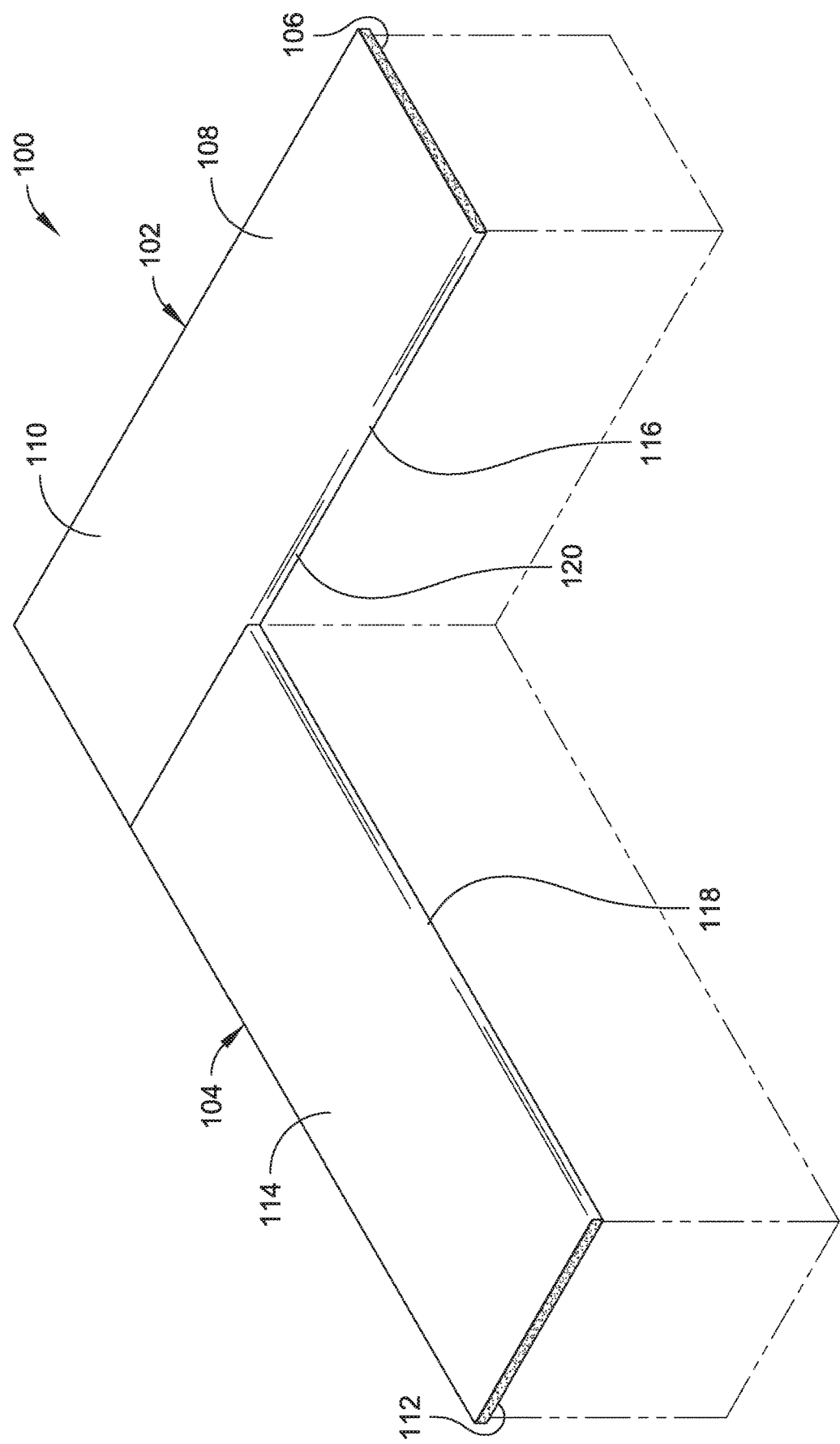
FIG. 1 is an isometric view illustrating a laminated countertop assembly in accordance with example embodiments of the present disclosure.
Figure 2:
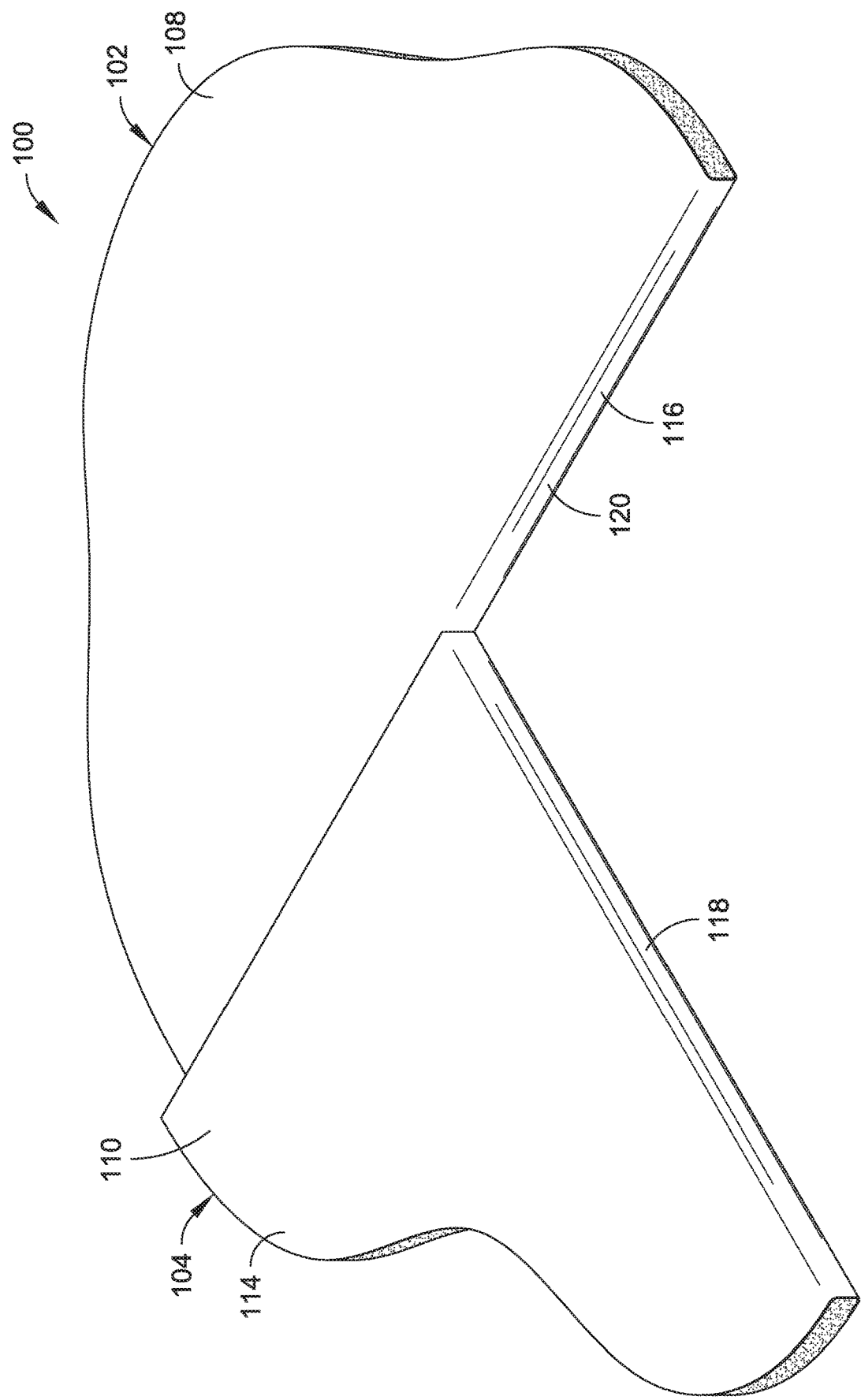
FIG. 2 is a partial cross-sectional isometric view of the laminated countertop assembly illustrated in FIG. 1.
Figure 3:
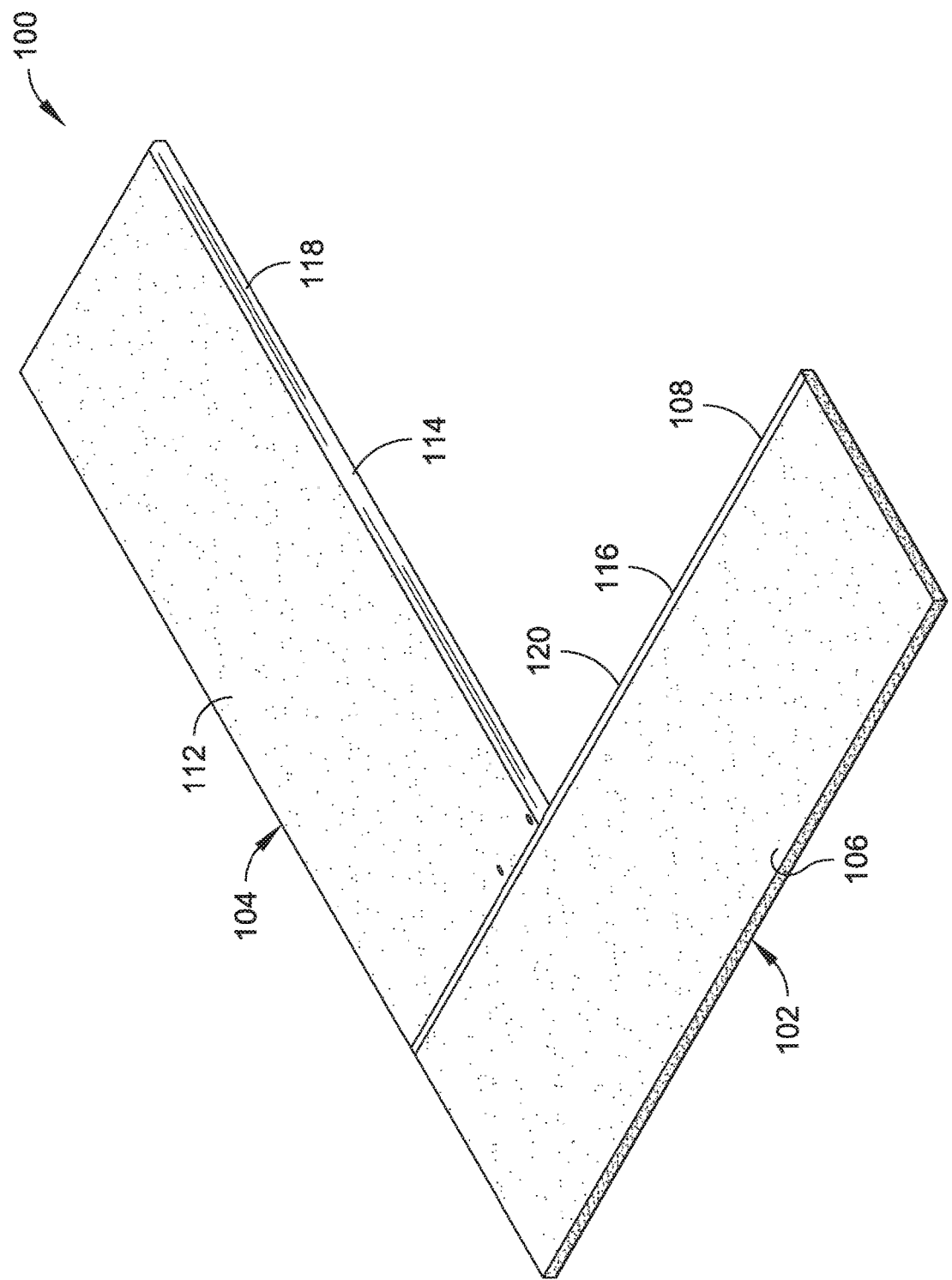
FIG. 3 is an underside isometric view of the laminated countertop assembly illustrated in FIG. 1.
Figure 4:
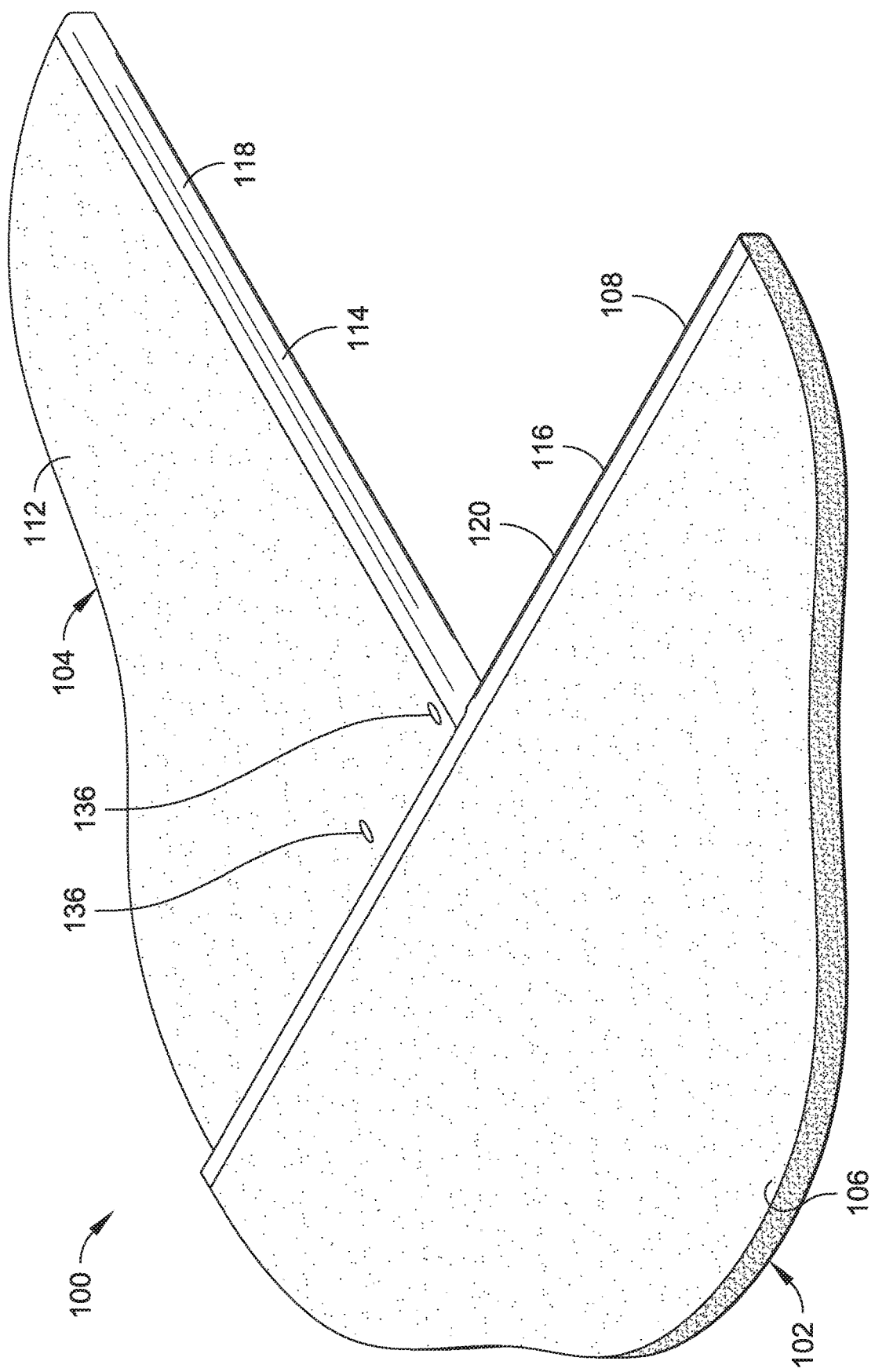
FIG. 4 is a partial cross-sectional underside isometric view of the laminated countertop assembly illustrated in FIG. 1.
Figure 5:
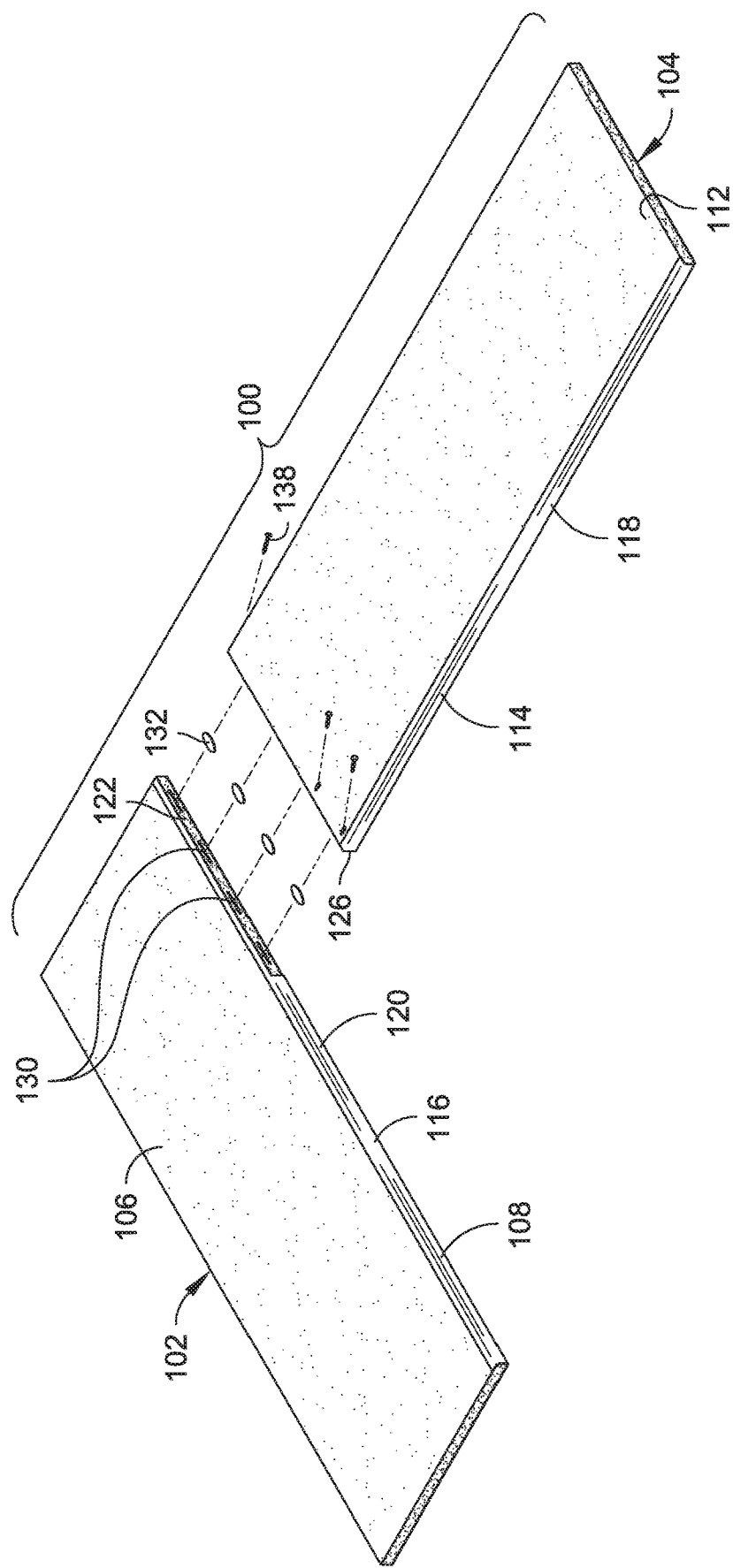
FIG. 5 is an exploded isometric view of the laminated countertop assembly illustrated in FIG. 1.
Figure 6:
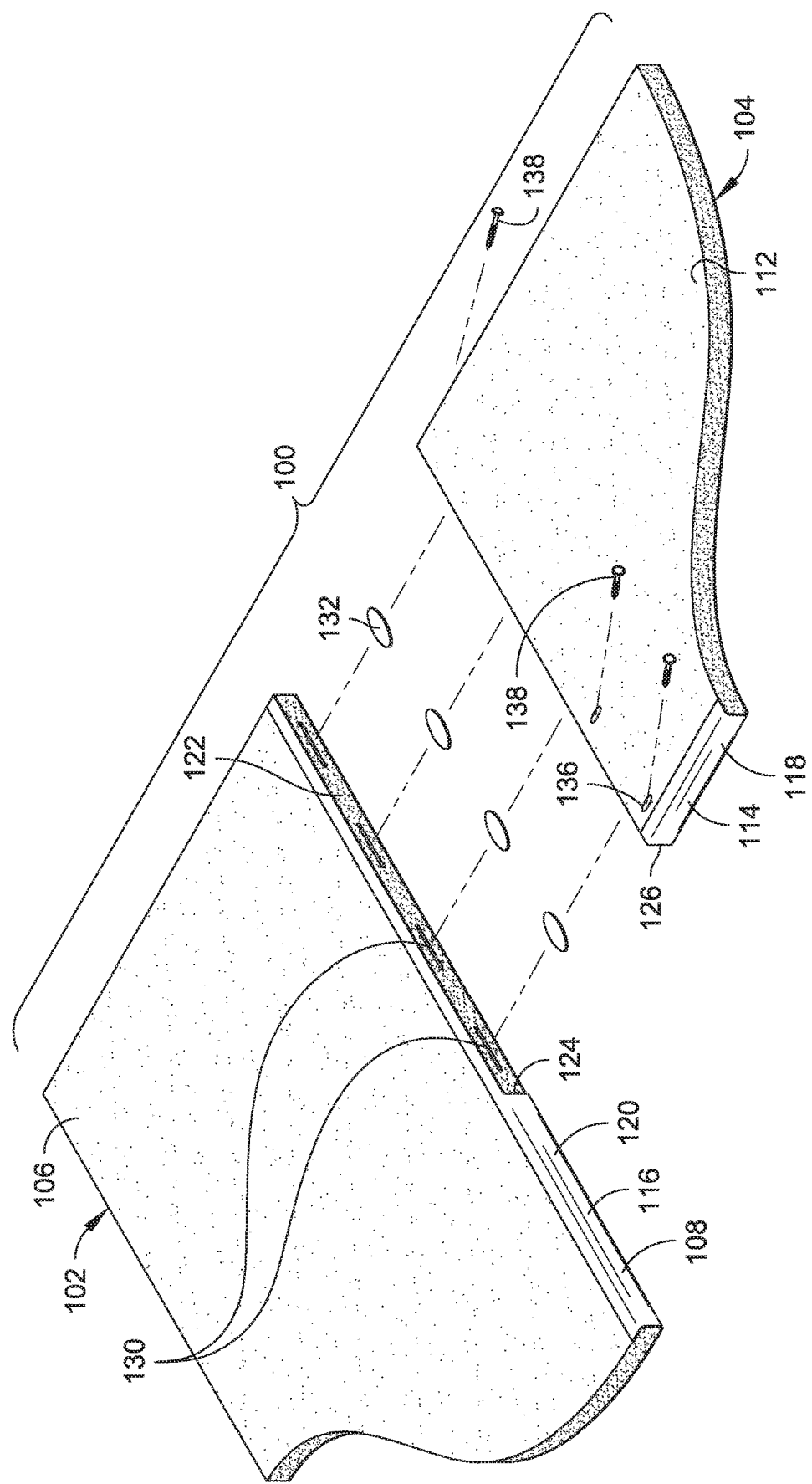
FIG. 6 is a partial cross-sectional exploded isometric view of the laminated countertop assembly illustrated in FIG. 1.
Figure 7:
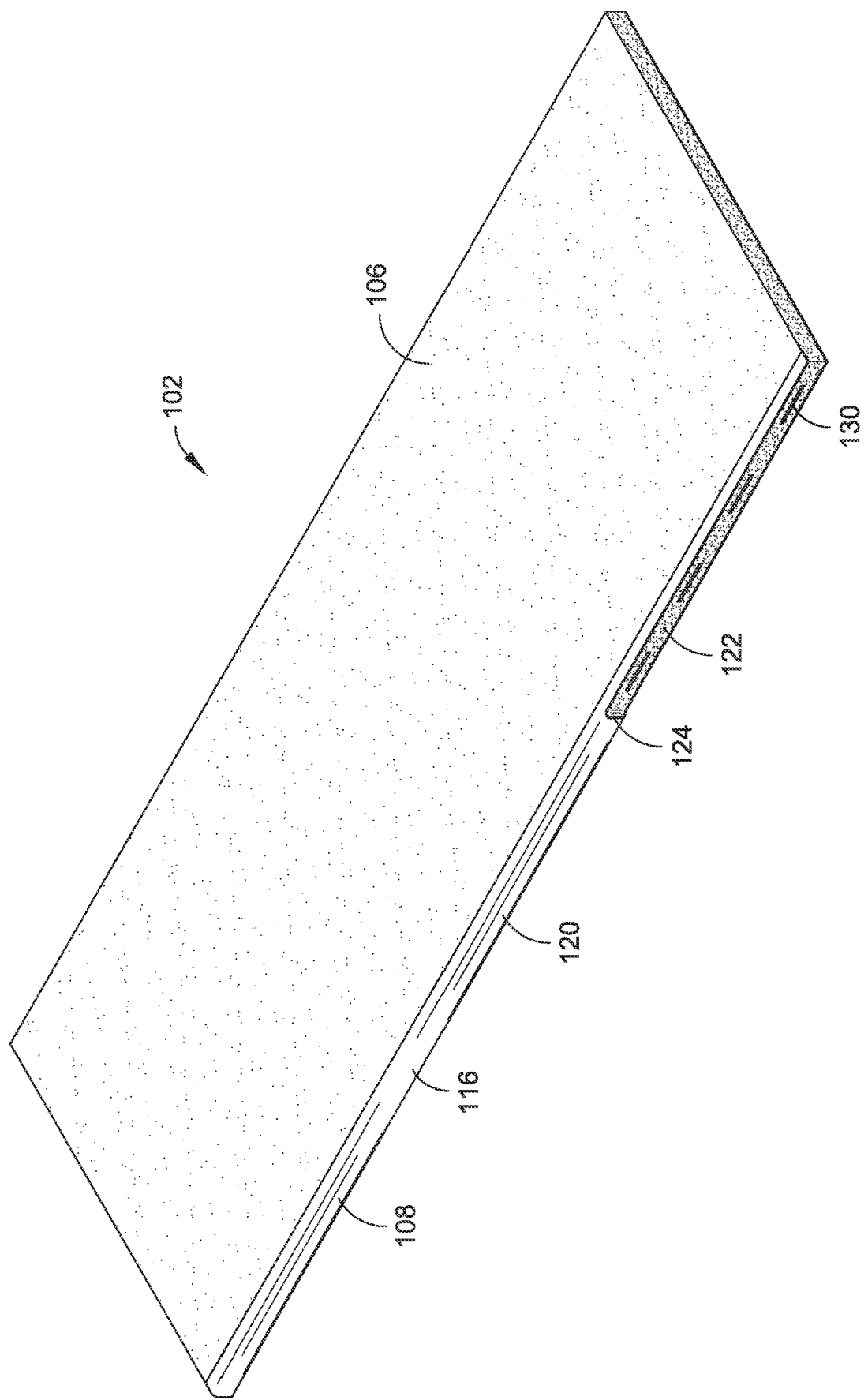
FIG. 7 is an isometric view of a laminated substrate for the laminated countertop assembly illustrated in FIG. 1.
Figure 8:
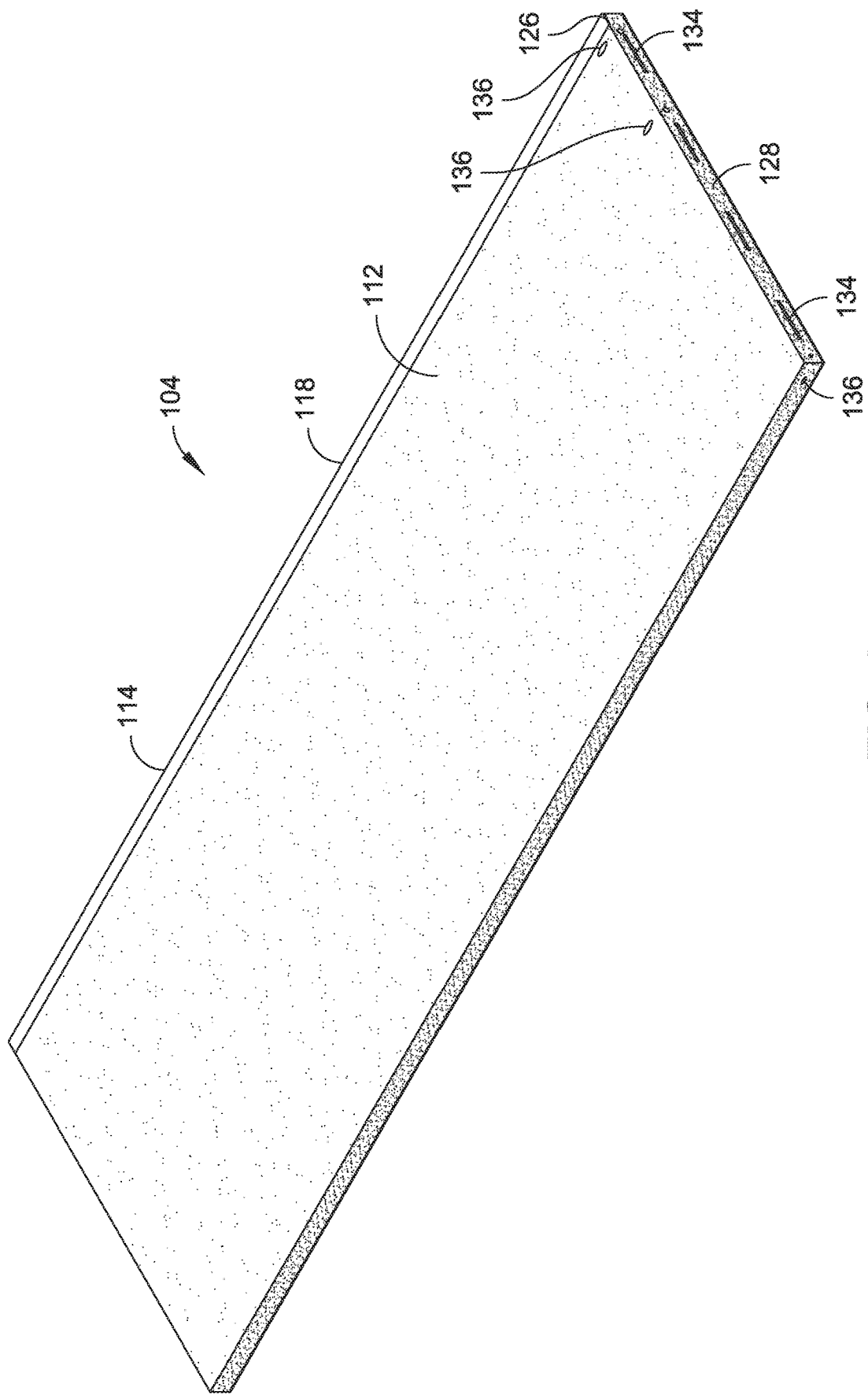
FIG. 8 is an isometric view of another laminated substrate for the laminated countertop assembly illustrated in FIG. 1.
Figure 9:
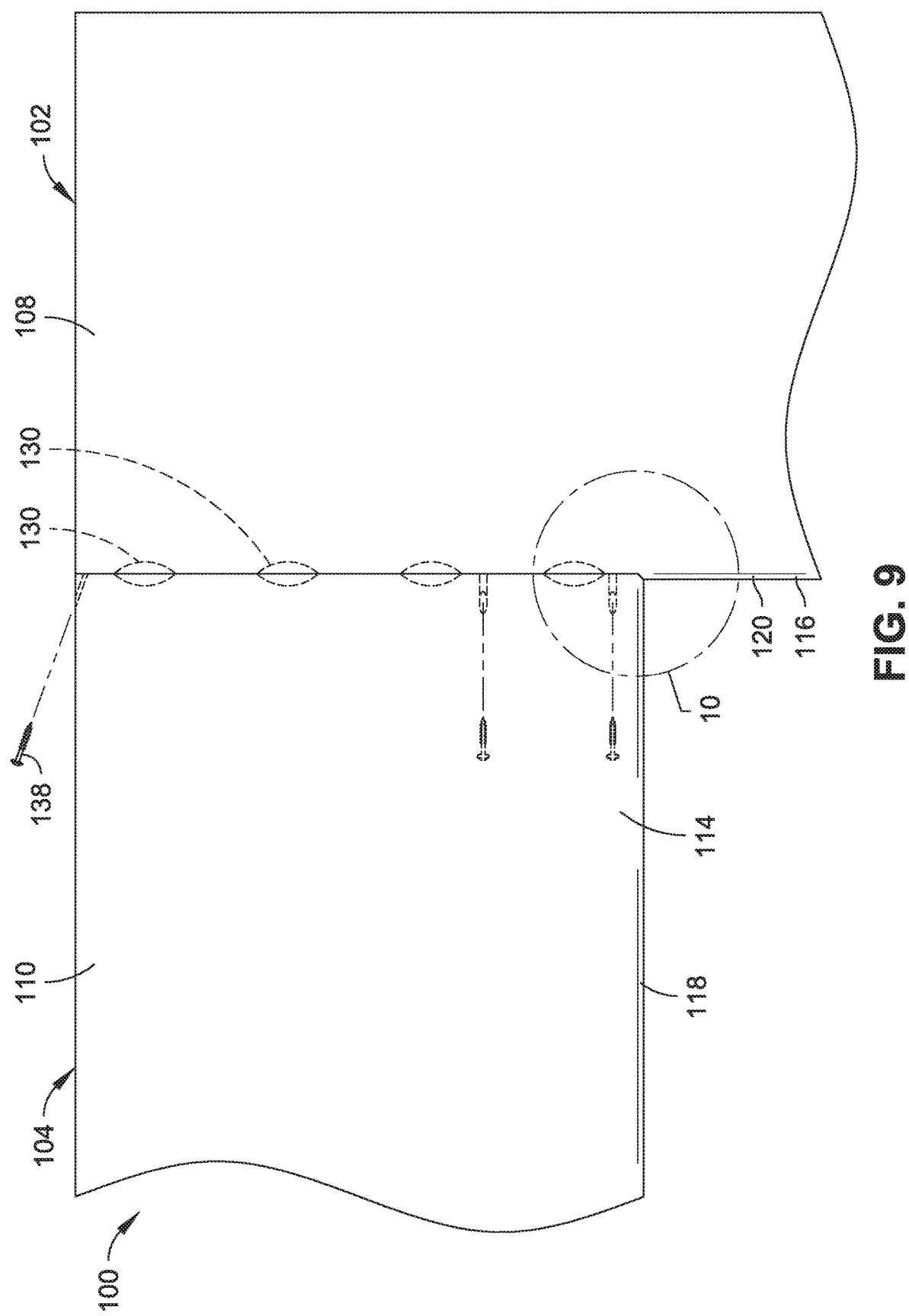
FIG. 9 is a partial top plan view of the laminated countertop assembly illustrated in FIG. 1.
Figure 10:
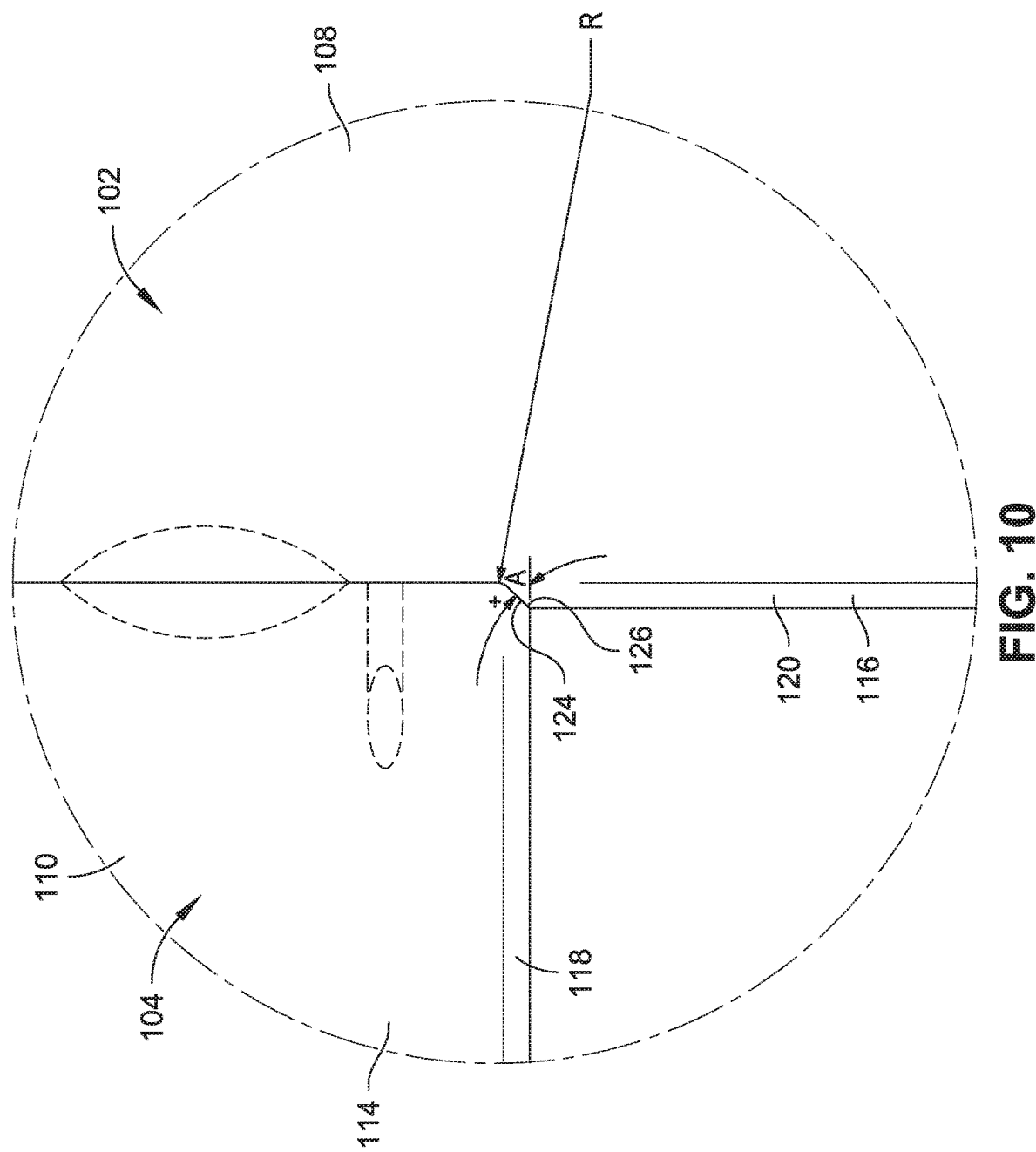
FIG. 10 is a detail view of the laminated countertop assembly illustrated in FIG. 1.

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. The following detailed description is, therefore, not to be taken in a limiting sense.

Referring generally to FIGS. 1 through 10, laminated countertop assemblies 100 are described in accordance with example embodiments of the present disclosure. A laminated countertop assembly 100 includes a first generally longitudinal slab 102 and a second generally longitudinal slab 104 configured to abut the generally longitudinal slab 102 (e.g., end-to-side). In some embodiments, the generally longitudinal slab 102 and the generally longitudinal slab 104 can be partially or fully laminated. For example, the generally longitudinal slab 102 includes a first substrate 106 with lamination 108 on at least a countertop side 110 (e.g., top side, work surface side) of the substrate 106. Similarly, the generally longitudinal slab 104 includes a second substrate 112 with lamination 114 on at least the countertop side 110 of the substrate 112.

In some embodiments, the generally longitudinal slab 102 and the generally longitudinal slab 104 may include a substrate 106 and a substrate 112 made of wood or a wood-like material. For instance, an engineered or composite wood, such as particle board or chip board can be used, e.g., where engineered wood is fabricated by mixing wood chips and/or sawdust with resin. However, particle board or chip board are provided by way of example and are not meant to limit the present disclosure. In other embodiments, the substrate 106 and/or the substrate 112 can be constructed using other various materials, including, but not necessarily limited to: milled lumber, plywood, fiberboard (e.g. medium density fiberboard, high density fiberboard), strand board, and so forth. Further, the generally longitudinal slabs 102 and/or 104 can be formed using other non-wood materials, such as plastic, stone, or stone-like materials.

The lamination 108 and lamination 114 applied to the substrate 106 and/or the substrate 112 can be formed of a thin sheet of laminate bonded to, for example, particle board substrate. The laminate can be formed of materials such as paper (e.g., overlay paper, decorative paper, kraft paper) and resin (e.g., melamine resin). The laminate materials can be bonded to the particle board substrate using glue and/or contact cement. An indexing unit can be used to align the laminate to the substrate, a roller can be used to bond the laminate to the substrate, and a press and/or post-forming machine can be used to heat and form (e.g., press) the laminate around the substrate. After the laminate has cured, a trim saw can be used to cut the substrate and laminate to size, forming the generally longitudinal slabs 102 and 104.

The lamination 108 and 114 on the substrate 106 and the substrate 112 can wrap around one or more edges of the substrates. For example, the substrate 106 includes lamination 108 on an edge side 116 of the substrate 106 (e.g., at least generally perpendicular and adjacent to the countertop side 110 of the substrate 106). Similarly, the substrate 112 includes lamination 114 on an edge side 118 of the substrate 112 (e.g., at least generally perpendicular and adjacent to the countertop side 110 of the substrate 112). The lamination can also extend partially or fully around a substrate to a side of a substrate opposite the countertop sides (e.g., bottom side, underside).

As described, the lamination 108 on the edge side 116 of the substrate 106 extends along only a first portion 120 of a length of the edge side 116 of the substrate 106. There is also an unlaminated second portion 122 of the edge side 116 of the substrate 106. In embodiments of the disclosure, the unlaminated portion 122 of the edge side 116 of the substrate 106 can be formed by removing the lamination 108 from the portion 122 of the edge side 116. For example, a trim saw can be used to cut (e.g., rip) the edge of the substrate 106 to expose the unlaminated portion 122 of the edge side 116. In other examples, different tools, such as a planar, a sander, and/or a grinder can be used to remove the lamination 108 from the portion 122 of the edge side 116.

A first miter cut 124 can be angled into the substrate 106 from where the laminated portion 120 of the edge side 116 of the substrate 106 meets the unlaminated portion 122 of the edge side 116 of the substrate 106. In some embodiments, the miter cut 124 is angled into the substrate 106 at an angle A (detail view, FIG. 10) of about forty-five degrees (45°). However, this angle is provided by way of example, and other angles greater than or less than forty-five degrees (45°) may be used. For example, the angle could be from about fifteen degrees (15°) to about seventy-five degrees (75°). A corresponding second miter cut 126 can be made at a corner of the substrate 112 where the laminated edge side 118 of the substrate 112 meets an unlaminated end side 128 (FIG. 8) of the substrate 112. The second miter cut 126 is configured to abut the first miter cut 124. In some embodiments, a radius R (detail view, FIG. 10) can be machined into the edge side 116 of the substrate 106 (e.g., where the miter cut 124 meets the unlaminated portion 122 of the edge side 116 of the substrate 106) and/or at the corner of the substrate 112. In some embodiments, the radius R can be between about one-eighth inch ⅛" and about one-quarter inch (¼"). However, the radius R may also have different dimensions.

The generally longitudinal slab 102 can include slots 130 extending into the substrate 106 along the unlaminated portion 122 of the edge side 116 of the substrate 106, where each one of the slots 130 is for receiving a biscuit 132. Similarly, the generally longitudinal slab 104 can include slots 134 (FIG. 8) extending into the substrate 112 along the unlaminated end side 128 of the substrate 112, where each one of the slots 134 is also for receiving a biscuit 132. In embodiments of the disclosure, the slots 130 and 134 are aligned for receiving the biscuits 132 to register the generally longitudinal slab 102 and the generally longitudinal slab 104 together at an interface between the unlaminated portion 122 of the edge side 116 of the substrate 106 and the unlaminated end side 128 of the substrate 112.

In some embodiments, the generally longitudinal slab 104 can include one or more predrilled angled holes 136 (e.g., pilot holes, pocket holes), each for receiving a fastener (e.g., a pocket screw 138, a bolt, and so forth) to draw the generally longitudinal slab 102 to the generally longitudinal slab 104 by screwing through the holes in the generally longitudinal slab 104 into the generally longitudinal slab 102. In some embodiments, a predrilled angled hole 136 can be drilled from a side of the substrate 112 opposite the countertop side 110 of the substrate 112 (e.g., bottom side, underside). In some embodiments, a predrilled angled hole 136 can be drilled from a side of the substrate 112 opposite the edge side 118 of the substrate 112 (e.g., back side, wall side). It should be noted that predrilled angled holes in the generally longitudinal slab 104 are provided by way of example and are not meant to limit the present disclosure. In other embodiments, one or more predrilled angled holes can be positioned in the generally longitudinal slab 102 (and possibly in both the generally longitudinal slab 102 and the generally longitudinal slab 104).

It should be noted that while the two generally longitudinal slabs 102 and 104 are described herein, one or more additional slabs may be affixed to the generally longitudinal slab 102 and/or the generally longitudinal slab 104. Such additional slabs may be joined using the same apparatus and techniques described with reference to FIGS. 1 through 10. For example, a third laminated slab can be joined to the generally longitudinal slab 104 (e.g., at an end side opposite the end side 128).

The following discussion describes procedures for constructing and/or installing the laminated countertop assemblies 100 described herein. The procedures are shown as a set of blocks that specify operations performed by one or more devices (e.g., equipment including, but not necessarily limited to: saws, mills, joiners, laminators, computer system(s) controlling such equipment, and so forth) and are not necessarily limited to the order shown for performing the operations by the respective blocks. In portions of the following discussion, reference will be made to the laminated countertop assemblies 100 described with reference to FIGS. 1 through 10.

Figure 11:
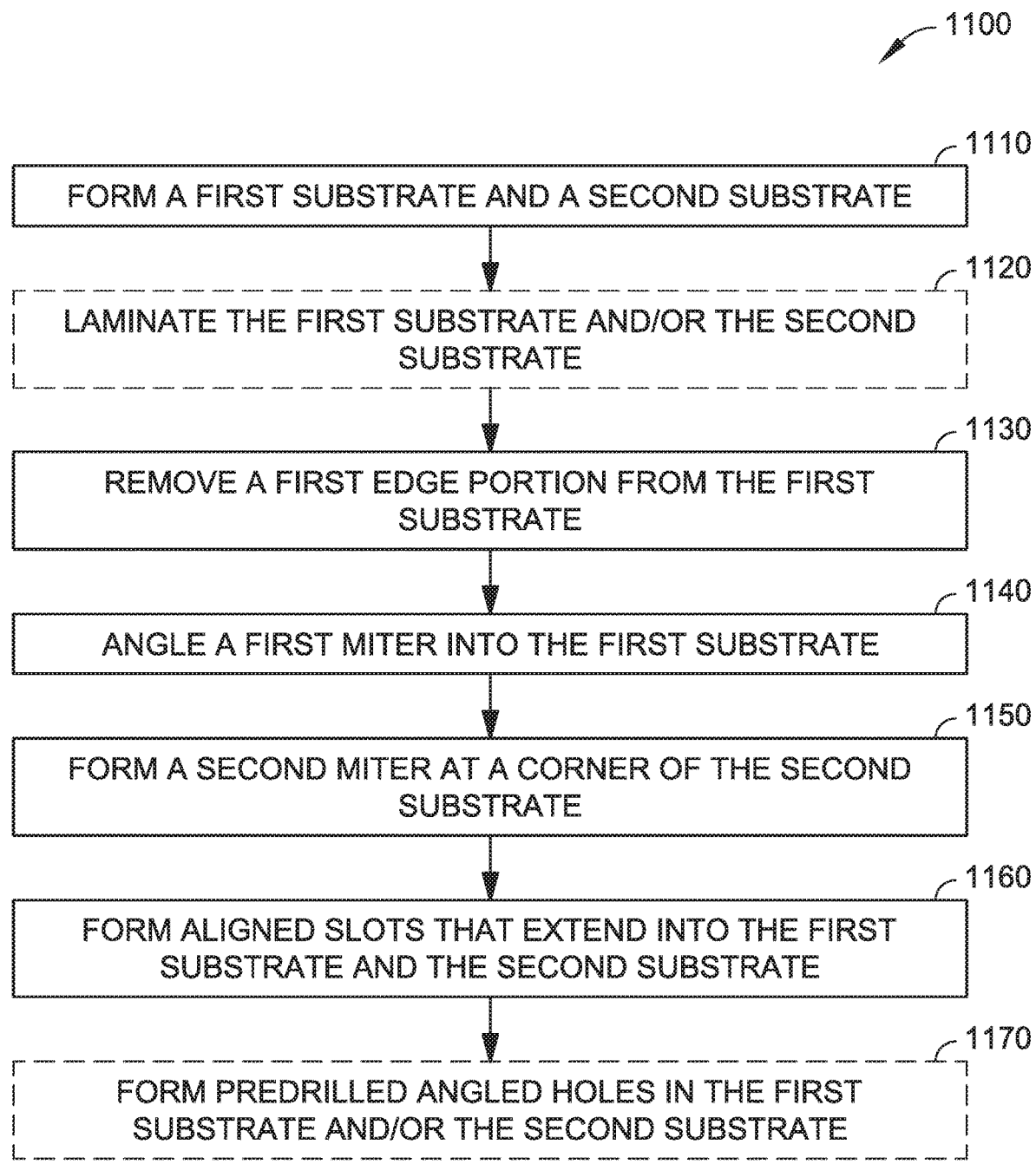
FIG. 11 is a flow diagram illustrating a method of fabricating a laminated countertop assembly, such as the laminated countertop assembly illustrated in FIGS. 1 through 10, in accordance with example embodiments of the present disclosure.

FIG. 11 depicts a procedure 1100 in an example implementation in which a laminated countertop assembly, such as a laminated countertop assembly 100, is fabricated. With reference to FIG. 11, a first substrate and a second substrate are formed (Block 1110). In some embodiments, the substrates 106 and/or 112 are formed of wood or wood-like material, e.g., using an engineered or composite wood, such as particle board or chip board, as previously described. The wood or wood-like material can be formed and/or cut to a dimensional size for countertop installation. For example, the substrate 106 can be formed and/or cut to a longitudinal shape about twenty-five inches (25") wide, and between about seventy-two inches (72") and about one hundred and twenty inches (120") long. The substrate 112 can also be formed and/or cut to a longitudinal shape about twenty-five inches (25") wide, and between about seventy-two inches (72") and about one hundred and twenty inches (120") long. In some embodiments, the substrates 106 and/or 112 may be the full cross-sectional thickness of the material used to construct the substrate (e.g., about one-inch (1") or more of particle board thickness). However, these dimensions are provided by way of example and are not meant to limit the present disclosure. In other embodiments, the substrates 106 and/or 112 can have different dimensions.

As described, the apparatus, systems, and techniques of the present disclosure can reduce or eliminate the need to use a build up kit. For example, in another type of countertop installation, the countertop is constructed from about three-quarter inch (¾") thick particle board with a profiled edge along one side which protrudes about another (¾"), for a total thickness of about one and one-half inches (1½") at an edge of the countertop. A build up kit is then used to elevate the countertop to provide clearance for the profiled edge, e.g., so as not to interfere with drawers positioned below the countertop. In contrast, full-thickness substrates as described herein can reduce or eliminate the need for such a build up kit. However, in some embodiments, a build up kit may also be used. For example, the substrates 106 and/or 112 may be formed with a profiled edge.

In some embodiments, one or more of the substrates may be laminated (Block 1120). For instance, lamination 108 and/or 114 can be applied to the substrate 106 and/or 112. The lamination 108 and/or 114 can be formed of a thin sheet of laminate bonded to, for example, particle board substrate. As previously described, the laminate can be formed of materials such as paper and resin bonded to the particle board substrate using glue and/or contact cement. An indexing unit can be used to align the laminate to the substrate, a roller can be used to bond the laminate to the substrate, and a press and/or post-forming machine can be used to heat and form (e.g., press) the laminate around the substrate. After the laminate has cured, a trim saw can be used to cut the substrate and laminate to size, forming generally longitudinal slabs 102 and 104.

Referring again to FIG. 11, a first edge portion is removed from the first substrate (Block 1130). For example, the unlaminated portion 122 of the edge side 116 of the substrate 106 is formed by removing the lamination 108 from the portion 122 of the edge side 116. In embodiments, a trim saw, a planar, a sander, a grinder, and so forth, may be used to trim the edge of the substrate 106 to expose the unlaminated portion 122 of the edge side 116. Then, a first miter is angled into the first substrate (Block 1140). For instance, the first miter cut 124 is angled into the substrate 106 from where the laminated portion 120 of the edge side 116 of the substrate 106 meets the unlaminated portion 122 of the edge side 116 of the substrate 106. A second miter is formed at a corner of the second substrate (Block 1150). In embodiments, the second miter is configured to abut the first miter. For example, the second miter cut 126 is made at the corner of the substrate 112 where the laminated edge side 118 of the substrate 112 meets the unlaminated end side 128 of the substrate 112. In some embodiments, radius R can be formed or machined into the edge side 116 of the substrate 106 and/or at the corner of the substrate 112, e.g., as previously described.

As described, the apparatus, systems, and techniques of the present disclosure can reduce or eliminate much of the material that would otherwise be wasted in the fabrication of a countertop. For instance, in another type of countertop installation, a miter is made that extends from an inside corner formed where a first substrate meets a second substrate to an outside corner opposite the inside corner, e.g., where a forty-five degree (45°) angle is cut in two opposing parts to create a ninety degree (90°) corner joint, and where the forty-five degree (45°) angle cut extends the full width of both parts. In contrast, the substrates 106 and/or 112 described herein allow for a reduction in the overall length of countertop needed, as the removal of two full triangular ends worth of material from both substrates is eliminated. Instead, only a thin strip of material along an edge portion of the first substrate is removed (e.g., resulting in a reduction in width of about three-sixteenths inches (3/16") in some instances). Additionally, the laminated countertop assemblies 100 described herein provide a joint which remains perpendicular for nearly the full width of the countertop, providing a cosmetic improvement over, for example, a countertop with a forty-five degree (45°) angle that extends the full width of the countertop.

With reference to FIG. 11, aligned slots are formed that extend into the first substrate and the second substrate (Block 1160). For instance, the generally longitudinal slab 102 includes the slots 130 that extend into the substrate 106 along the unlaminated portion 122 of the edge side 116 of the substrate 106, where each one of the slots 130 is for receiving a biscuit 132. Similarly, the generally longitudinal slab 104 includes the slots 134 that extend into the substrate 112 along the unlaminated end side 128 of the substrate 112, where each one of the slots 134 is also for receiving a biscuit 132. The slots 130 and 134 are aligned to register the generally longitudinal slab 102 and the generally longitudinal slab 104 together at the interface between the unlaminated portion 122 of the edge side 116 of the substrate 106 and the unlaminated end side 128 of the substrate 112.

In some embodiments, the slots 130 and/or 134 can be formed using a biscuit joiner or plate joiner, e.g., where a circular blade is used to cut crescent-shaped holes in the first and/or second substrates. In some embodiments, the slots 130 and/or 134 can be centered about one-half inch (½") from a top surface or countertop side 110 of the substrates 106 and/or 112. However, in other embodiments, the slots 130 and/or 134 can be centered at other distances from the top and/or bottom of the substrates 106 and/or 112. It should also be noted that a biscuit joiner or plate joiner are provided by way of example and are not meant to limit the present disclosure. In other embodiments, other various equipment and techniques can be used to form slots, including other plunge cutting techniques. Further, the slots are not necessarily crescent-shaped. In some embodiments, the biscuits can be generally oval-shaped (e.g., #20 biscuits), or may have other shapes or be formed as other spline-like components, such that the two countertop parts are planar prior to final assembly.

Referring again to FIG. 11, predrilled angled holes may be formed in the first substrate and/or the second substrate (Block 1170). For example, the generally longitudinal slab 104 includes the predrilled angled holes 136 (e.g., pilot holes, pocket holes) for receiving pocket screws 138 to draw the generally longitudinal slab 102 to the generally longitudinal slab 104. In some embodiments, a predrilled angled hole 136 can be drilled from a bottom side of the substrate 112 and another predrilled angled hole 136 can be drilled from a back or wall side of the substrate 112.

Figure 12:
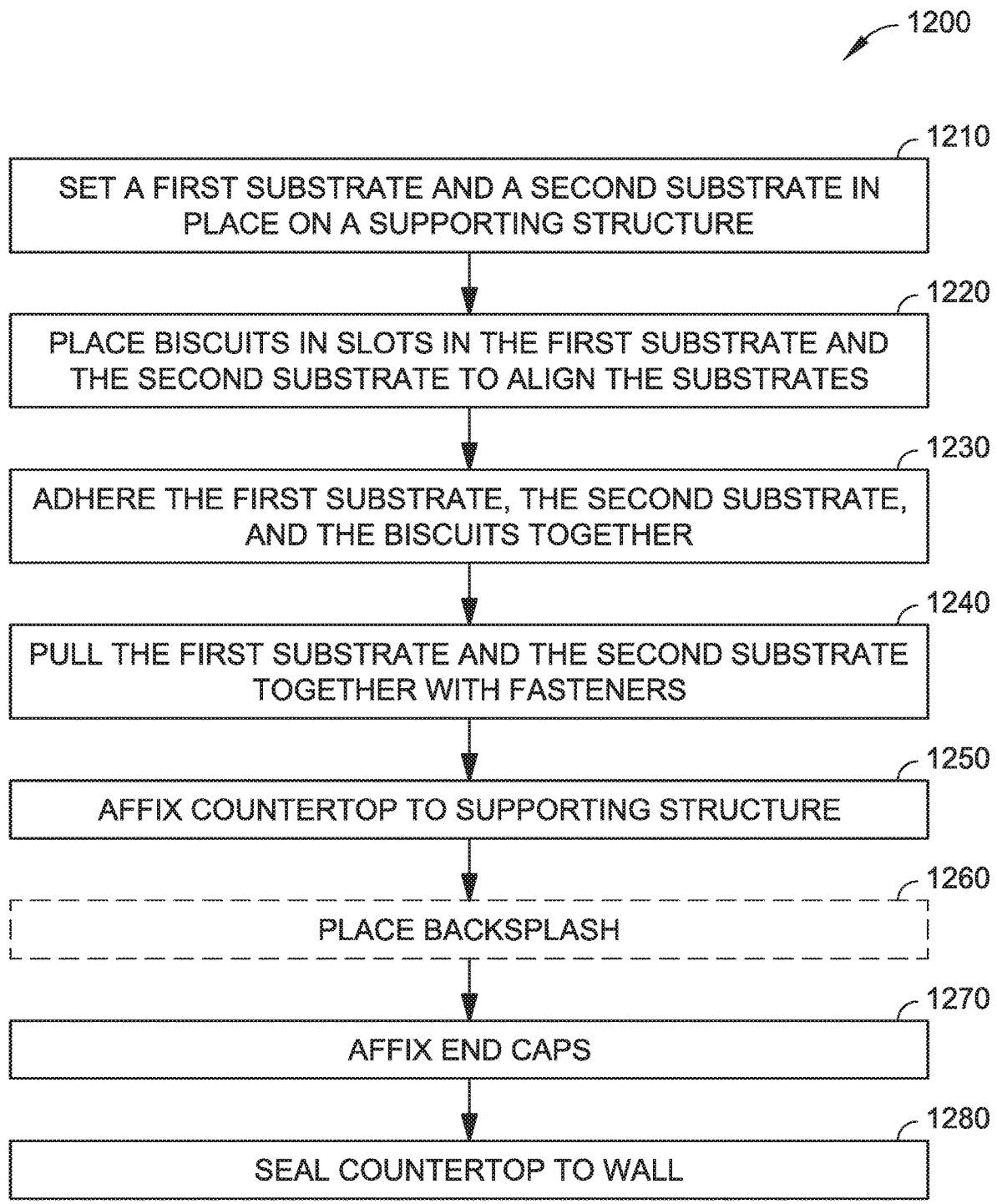
FIG. 12 is a flow diagram illustrating a method of installing a laminated countertop assembly, such as the laminated countertop assembly illustrated in FIGS. 1 through 10, in accordance with example embodiments of the present disclosure.

FIG. 12 depicts a procedure 1200 in an example implementation in which a laminated countertop assembly, such as the laminated countertop assembly 100, is installed. With reference to FIG. 12, a first substrate and a second substrate are set in place on a supporting structure (Block 1210). For instance, the first and second countertop substrates 106 and/or 112 are set in place on underlying kitchen cabinets. In some embodiments, the substrates 106 and/or 112 can be marked (scribed) for fit, removed and cut, and then replaced. Biscuits are placed in slots in the first and second substrates to align the substrates (Block 1220). For example, biscuits 132 are inserted into the slots 130 that extend into the substrate 106 along the unlaminated portion 122 of the edge side 116 of the substrate 106, and into the slots 134 that extend into the substrate 112 along the unlaminated end side 128 of the substrate 112. As described, the slots 130 and 134 are aligned and register the generally longitudinal slab 102 and the generally longitudinal slab 104 together.

The first and second substrates and the biscuits are adhered together (Block 1230). For example, the substrates 106 and 112 and the biscuits 132 are connected at the joint using an adhesive, such as a moisture resistant adhesive. In some embodiments, the adhesive is multi-purpose. For example, the adhesive can be a glue that provides an adhesive to the wood joint, provides a moisture barrier to the wood joint, and/or provides a color-matched filler at cracks or gaps at the countertop surface. In some embodiments, the glue may include a dye that is color matched to, for example, the lamination 108 and/or 114.

The first and second substrates are pulled together using fasteners (Block 1240). For instance, fasteners (pocket screws 138, bolts, and so forth) are inserted into the predrilled angled holes 136 (pilot holes, pocket holes) to draw the generally longitudinal slab 102 to the generally longitudinal slab 104 by screwing through the holes in the generally longitudinal slab 104 into the generally longitudinal slab 102. In this manner, the pocket screws 138 pull the substrates 106 and 112 together tightly at the joint, which can reduce or eliminate the use of clamps that would otherwise be used to hold the substrates together. The techniques of the present disclosure may allow the countertop to be constructed from a standing position (e.g., without requiring access to an underside of the countertop).

In another type of countertop installation, where miter bolts are used to draw two countertop parts together, the miter bolts are placed on the underside of the countertop and tightened together, with an installer working from underneath the countertop and inside the cabinets. Using miter bolts, a miter joint may be difficult to bring together and keep planar across the width of the countertop as the miter bolts are tightened. Furthermore, if a crack is present at the miter joint after the bolts are tightened, it can be difficult to permanently fill the crack to both conceal the edge of the laminate as well as to provide moisture resistance. Additionally, this type of installation may take an installer between about forty (40) to fifty (50) minutes, while the apparatus, systems, and techniques of the present disclosure can facilitate a countertop installation in between about ten (10) to fifteen (15) minutes. Moreover, a single person may accomplish the installation of a laminated countertop assembly 100 as described herein, and a professional installer is not necessarily needed.

Referring again to FIG. 12, the countertop is affixed to the supporting structure (1250). For example, the laminated countertop assembly 100 can be glued or otherwise attached to underlying cabinetry, such as kitchen cabinets. In embodiments, an adhesive can be used to glue the laminated countertop assembly 100 to the cabinetry. In some embodiments, angle brackets and fasteners, such as screws or bolts, may also be used to fasten the laminated countertop assembly 100 to the cabinetry and/or wall. In some embodiments, a backsplash can be placed (1260). For example, a backsplash (not shown) can be cut to size and then placed at the back or wall side of the laminated countertop assembly 100. When the backsplash is not integrally formed with the generally longitudinal slabs 102 and/or 104, less precise measuring and trimming of the substrates 106 and/or 112 may be required, e.g., as a separate backsplash covers any gaps present between the laminated countertop assembly 100 and the wall. This can further facilitate single person, non-professional installation of a laminated countertop assembly 100. The backsplash can be connected (e.g., glued) to the wall and/or the countertop. For example, the same or similar multi-purpose adhesive can be used to glue the backsplash to the laminated countertop assembly 100.

End caps can be affixed to one or more ends of the countertop (Block 1270). For example, end caps (not shown) can be glued to exposed ends of the substrates 106 and/or 112. In some embodiments, the end caps can be cut from laminate sheets, glued to one or more ends of the substrates 106 and/or 112, and trimmed after bonding. In some embodiments, the end(s) of the substrates 106 and/or 112 may also be pre-laminated (e.g., where end caps are not used). One or more ends of the substrates 106 and/or 112 may also remain unlaminated (e.g., where a substrate end abuts a wall). The countertop is sealed to the wall (Block 1280). For instance, caulk and/or other sealants can be used to seal the laminated countertop assembly 100 to one or more walls.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A laminated countertop assembly comprising:
 a first generally longitudinal slab including
  a first substrate;
  lamination on a countertop side of the first substrate;
  lamination on an edge side of the first substrate at least generally perpendicular and adjacent to the countertop side of the first substrate, the lamination on the edge side of the first substrate extending along a first portion of a length of the edge side of the first substrate;
  a first miter cut angled into the first substrate from where the laminated first portion of the edge side of the first substrate meets an unlaminated second portion of the edge side of the first substrate; and
  a first plurality of slots extending into the first substrate along the second portion of the edge side of the first substrate, each one of the first plurality of slots for receiving a biscuit; and
 a second generally longitudinal slab configured to abut the first generally longitudinal slab, the second generally longitudinal slab including
  a second substrate;
  lamination on a countertop side of the second substrate;
  lamination on an edge side of the second substrate at least generally perpendicular and adjacent to the countertop side of the second substrate;
  a second miter cut at a corner of the second substrate where the laminated edge side of the second substrate meets an unlaminated end side of the second substrate, the second miter cut configured to abut the first miter cut; and
  a second plurality of slots extending into the second substrate along the unlaminated end side of the second substrate, each one of the second plurality of slots for receiving a biscuit, the first plurality of slots and the second plurality of slots aligned for receiving a plurality of biscuits to register the first generally longitudinal slab and the second generally longitudinal slab together at an interface between the unlaminated second portion of the edge side of the first substrate and the unlaminated end side of the second substrate,
 at least one of the first substrate or the second substrate defining a predrilled angled hole for receiving a fastener to draw the other of the first substrate or the second substrate together with the at least one of the first substrate or the second substrate, wherein the first substrate defines a radius at an interface between the first miter cut and the unlaminated second portion of the edge side of the first substrate, and the second substrate defines the radius at an interface between the second miter cut and the unlaminated end side of the second substrate.

2. The laminated countertop assembly as recited in claim 1, wherein at least one of the first substrate or the second substrate is formed of an engineered or composite wood.

3. The laminated countertop assembly as recited in claim 1, wherein at least one of the first substrate or the second substrate is formed of a particle board or a chip board.

4. The laminated countertop assembly as recited in claim 1, wherein the laminate comprises paper and resin.

5. The laminated countertop assembly as recited in claim 1, wherein at least one of the first substrate or the second substrate has a full cross-sectional thickness of at least one inch (1") or more.

6. A laminated countertop assembly comprising:
a first generally longitudinal slab including
   a first substrate;
   lamination on a countertop side of the first substrate;
   lamination on an edge side of the first substrate at least generally perpendicular and adjacent to the countertop side of the first substrate, the lamination on the edge side of the first substrate extending along a first portion of a length of the edge side of the first substrate;
   a first miter cut angled into the first substrate from where the laminated first portion of the edge side of the first substrate meets an unlaminated second portion of the edge side of the first substrate; and
   a first plurality of slots extending into the first substrate along the second portion of the edge side of the first substrate, each one of the first plurality of slots for receiving a biscuit; and
a second generally longitudinal slab configured to abut the first generally longitudinal slab, the second generally longitudinal slab including
   a second substrate;
   lamination on a countertop side of the second substrate;
   lamination on an edge side of the second substrate at least generally perpendicular and adjacent to the countertop side of the second substrate;
   a second miter cut at a corner of the second substrate where the laminated edge side of the second substrate meets an unlaminated end side of the second substrate, the second miter cut configured to abut the first miter cut; and
   a second plurality of slots extending into the second substrate along the unlaminated end side of the second substrate, each one of the second plurality of slots for receiving a biscuit, the first plurality of slots and the second plurality of slots aligned for receiving a plurality of biscuits to register the first generally longitudinal slab and the second generally longitudinal slab together at an interface between the unlaminated second portion of the edge side of the first substrate and the unlaminated end side of the second substrate, wherein the first substrate defines a radius at an interface between the first miter cut and the unlaminated second portion of the edge side of the first substrate, and the second substrate defines the radius at an interface between the second miter cut and the unlaminated end side of the second substrate.

7. The laminated countertop assembly as recited in claim 6, wherein at least one of the first substrate or the second substrate defines a predrilled angled hole for receiving a fastener to draw the other of the first substrate or the second substrate together with the at least one of the first substrate or the second substrate.

8. The laminated countertop assembly as recited in claim 6, wherein at least one of the first substrate or the second substrate is formed of an engineered or composite wood.

9. The laminated countertop assembly as recited in claim 6, wherein at least one of the first substrate or the second substrate is formed of a particle board or a chip board.

10. The laminated countertop assembly as recited in claim 6, wherein the laminate comprises paper and resin.

11. The laminated countertop assembly as recited in claim 6, wherein at least one of the first substrate or the second substrate has a full cross-sectional thickness of at least one inch (1") or more.

12. A method of forming a laminated countertop assembly, the method comprising:
   forming a first substrate;
   laminating a countertop side of the first substrate;
   laminating an edge side of the first substrate at least generally perpendicular and adjacent to the countertop side of the first substrate so that the lamination on the edge side of the first substrate extends along a first portion of a length of the edge side of the first substrate;
   angling a first miter cut into the first substrate from where the laminated first portion of the edge side of the first substrate meets an unlaminated second portion of the edge side of the first substrate;
   forming a first plurality of slots extending into the first substrate along the second portion of the edge side of the first substrate, each one of the first plurality of slots for receiving a biscuit;
   forming a second substrate;
   laminating a countertop side of the second substrate;
   laminating an edge side of the second substrate at least generally perpendicular and adjacent to the countertop side of the second substrate;
   angling a second miter cut at a corner of the second substrate where the laminated edge side of the second substrate meets an unlaminated end side of the second substrate, the second miter cut configured to abut the first miter cut;
   forming a second plurality of slots extending into the second substrate along the unlaminated end side of the second substrate, each one of the second plurality of slots for receiving a biscuit, the first plurality of slots and the second plurality of slots aligned for receiving a plurality of biscuits to register the first generally longitudinal slab and the second generally longitudinal slab together at an interface between the unlaminated second portion of the edge side of the first substrate and the unlaminated end side of the second substrate; and
   forming a radius in the first substrate at an interface between the first miter cut and the unlaminated second portion of the edge side of the first substrate, and forming the radius in the second substrate at an interface between the second miter cut and the unlaminated end side of the second substrate.

13. The method as recited in claim 12, further comprising predrilling an angled hole into at least one of the first substrate or the second substrate, the predrilled angled hole for receiving a fastener to draw the other of the first substrate or the second substrate together with the at least one of the first substrate or the second substrate.

14. The method as recited in claim 12, wherein at least one of the first substrate or the second substrate is formed of an engineered or composite wood.

15. The method as recited in claim 12, wherein at least one of the first substrate or the second substrate is formed of a particle board or a chip board.

16. The method as recited in claim 12, wherein the laminate comprises paper and resin.

17. The method as recited in claim 12, wherein at least one of the first substrate or the second substrate has a full cross-sectional thickness of at least one inch (1") or more.

* * * * *